April 22, 1969 C. H. BODE 3,439,717
VENDING MACHINE APPARATUS
Filed June 30, 1965

INVENTOR.
Charles H. Bode
BY
Synnestvedt & Lechner
ATTORNEYS

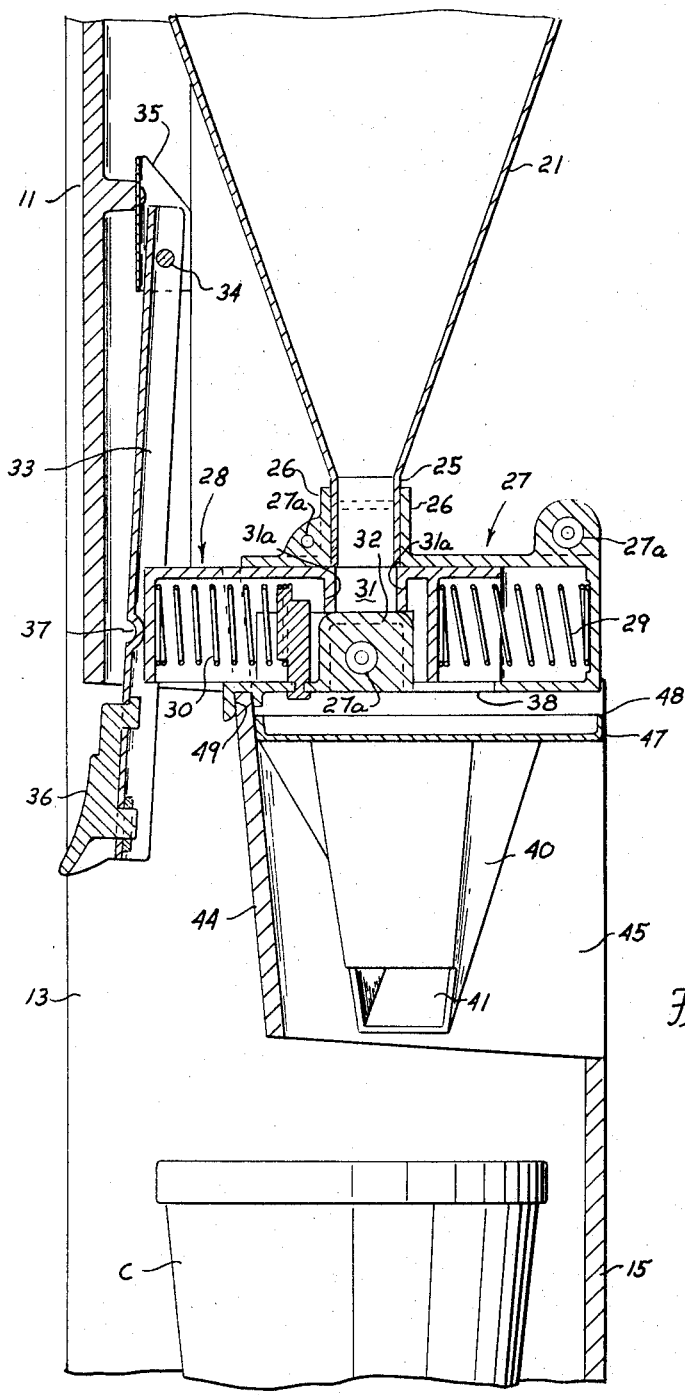

United States Patent Office 3,439,717
Patented Apr. 22, 1969

3,439,717
VENDING MACHINE APPARATUS
Charles Herbert Bode, Newhope, Pa., assignor to Rudd-Melikian, Inc., Warminster, Pa., a corporation of Pennsylvania
Filed June 30, 1965, Ser. No. 468,470
Int. Cl. B65b 1/04
U.S. Cl. 141—91                              3 Claims

ABSTRACT OF THE DISCLOSURE

Dispensing structure for use in vending machines comprises door mounted cannisters for cream and sugar, and separate funnel structures for delivering hot beverage and powdered commodities to a cup. The funnels are arranged with respect to air circulating fan to draw moisture away from the powdered commodity dispensers in order to prevent the accumulation of gummy deposits.

---

This invention relates to hot beverage brewing equipment and more particularly to the portion of such equipment provided for handling the powdered food commodities used in the preparation of the hot beverages.

The invention is especially adapted for use in vending machines of the type having dispensers for adding powdered cream and sugar to a freshly brewed cup of hot coffee or other hot beverage. A severe problem arises with these vending machines since the hot beverage gives off large amounts of steam which comes into contact with the discharge mechanism of the dispensers. Due to their hygroscopic nature, these powders readily take up the water vapor and form a gummy deposit within the dispensers and on various parts of the dispensing equipment. Such deposits are unsanitary and often cause objectionable odors, deterioration of powder quality and irregular powder measurement which cannot be tolerated in food handling equipment. This is especially true of vending machine equipment which must be capable of operation for long intervals without inspection, cleaning and/or repair.

With the foregoing in view, a primary object of the present invention is the provision of a highly efficient means for isolating the dispensing equipment for the powdered beverage ingredients from the hot vapors arising from a freshly prepared cup of coffee. The invention also provides a novel arrangement of the parts of the equipment used in dispensing the powdered ingredients whereby all of such equipment can be mounted on a hinged member, preferably on the inside of the front panel or door of the vending machine. When the door is closed, the dispensing equipment cooperates with the brewing equipment to fill a cup with hot coffee, as well as with the required amounts of cream and/or sugar. When the door is open, the powder dispensing equipment is moved away from the brewing equipment so that it is immediately accessible for service, cleaning, and repair. This arrangement also provides for easy servicing of the brewing equipment per se.

Another important part of the invention lies in constructing the dispensing equipment so that each element theerof can be easily removed from the door for cleaning, replacement, repair or disassembly without the use of any tools.

A further important feature of the invention lies in the provision of disposable containers for holding the powdered ingredients. These containers are supported on the front panel of the vending machine in such manner that they may be easily replaced by unskilled personnel without the use of tools. The entire structure forms a unit which substantially eliminates most of the sticky deposits characteristic of many hot beverage brewing machines which unit is exceptionally compact and easily disassembled for cleaning and repair.

The foregoing and other objects will become clearly apparent from the following detailed description and from the accompanying drawings in which:

FIGURE 4 is a view, in section, with portions of the structure broken away, taken along lines 4—4 of FIGURE 3.

Figure 1:
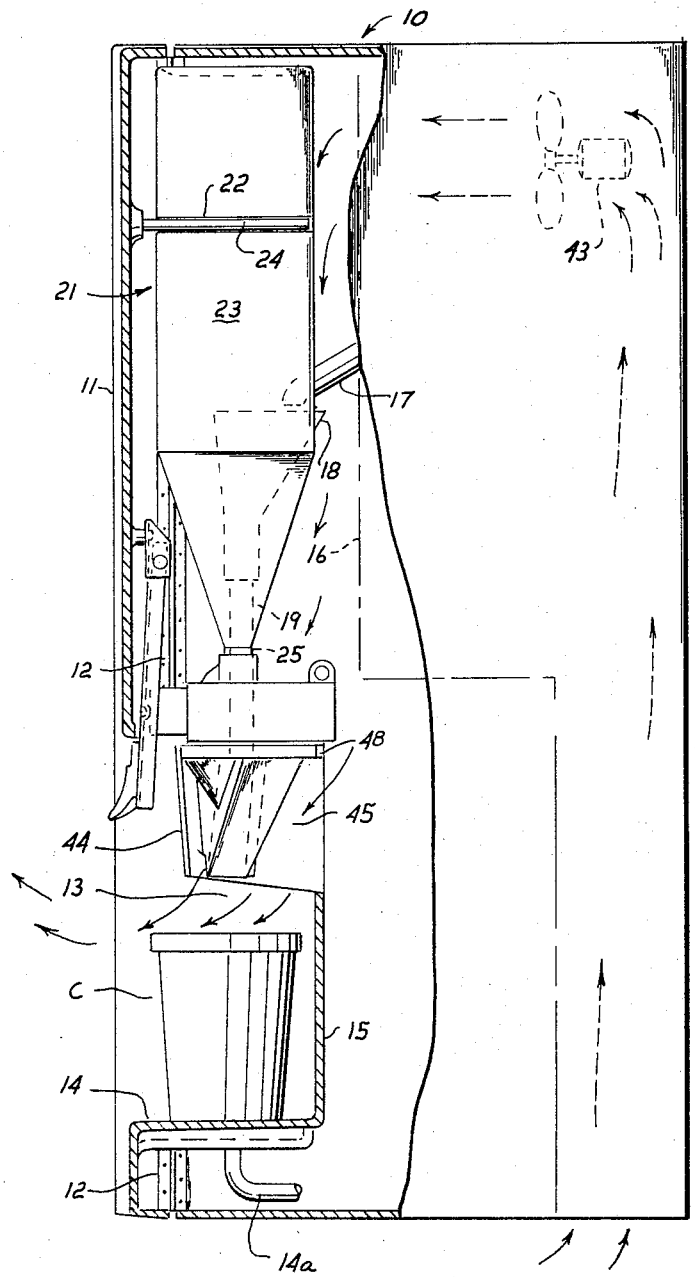
FIGURE 1 is a side elevational view, partly in section, of vending machine equipment embodying the features of this invention.

Turning first to FIGURE 1, the illustrative embodiment of the present invention is shown in conjunction with a wall-mounted coffee vending machine housed in a rectangular cabinet 10. The front panel of the cabinet forms a door 11 which is mounted on hinges 12 so that the equipment is accessible for cleaning and servicing.

The door 11 is provided with a recess 13, as viewed in FIGURE 1, the bottom or floor 14 of which forms a support for a cup C. Floor 14 is preferably recessed slightly as shown and the cup C is placed in the recess when it is to be filled with coffee. A drain 14a is provided in floor 14, in order to drain off any spilled coffee. Door 11, including recess 13 with its floor 14 and rear wall 15, is preferably an integral molded plastic unit, formed, for example, according to well known injection molding technique.

Suitable coffee brewing equipment, shown in dashed lines at 16, is mounted in the upper rear portion of the cabinet 10. This brewing equipment is preferably of the type described in Patent No. 3,327,613. An outlet spout 17, through which brewed hot coffee is delivered, is mounted on the front of the brewer.

Spout 17 is located immediately over the mouth of a funnel 18 mounted on the door 11. The funnel is provided with a downwardly extending discharge tube 19 which terminates above the cup support portion of floor 14, and delivers a cup-sized quantity of hot coffee to the cup C.

Figure 2:
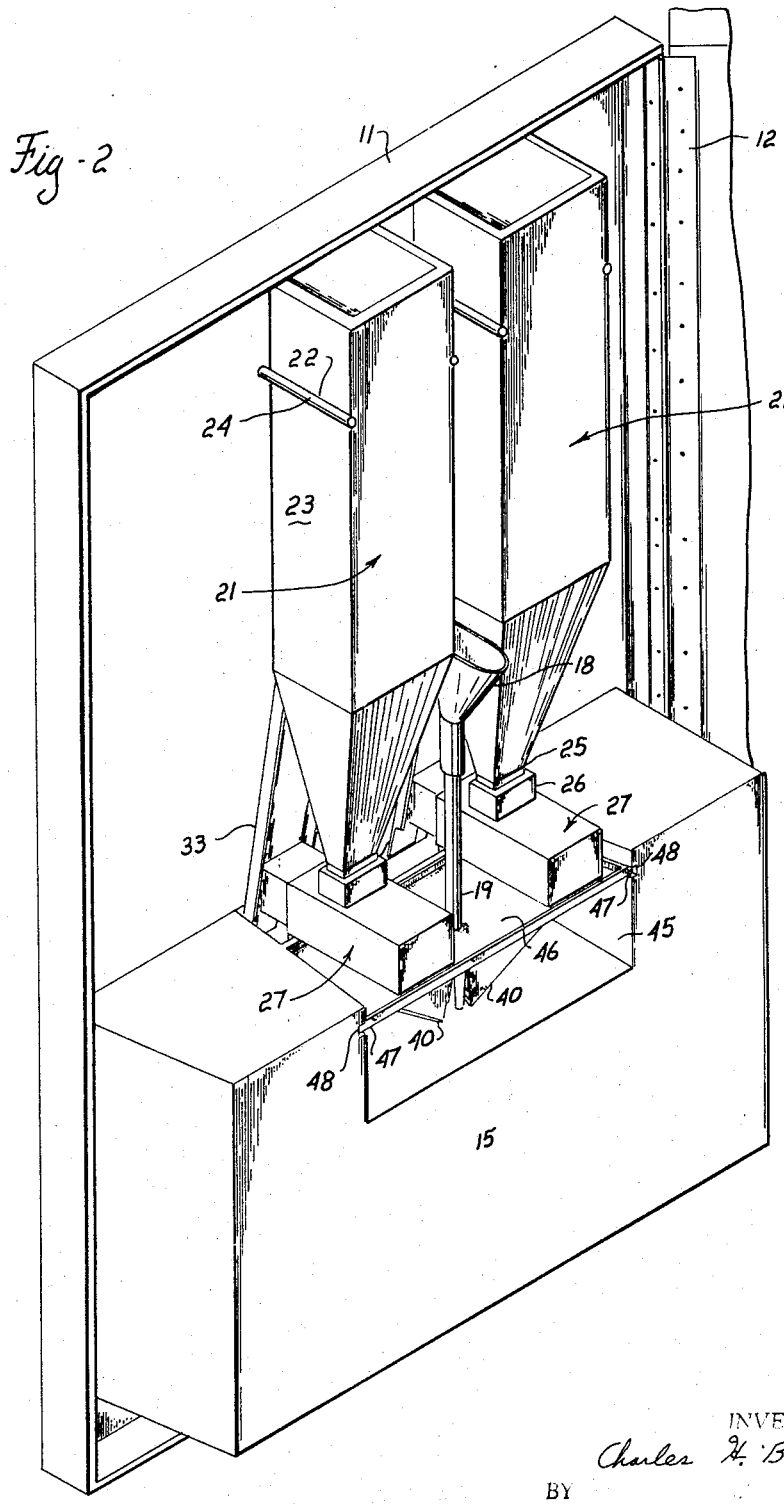
FIGURE 2 is an isometric projection of a vending machine door, as viewed from the rear, with the door swung to open position.
Figure 3:
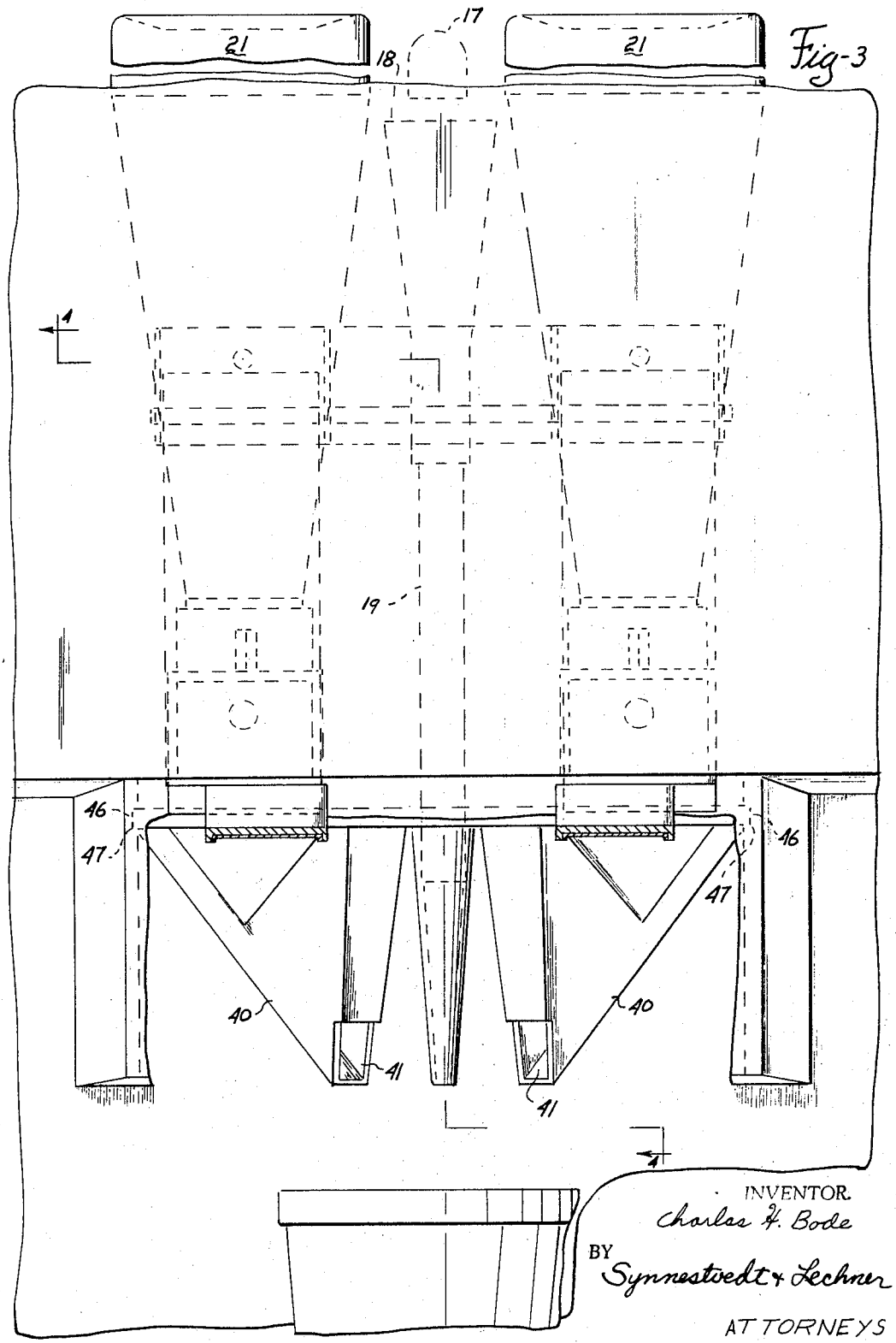
FIGURE 3 is a front view of the apparatus shown in FIGURES 1 and 2.

As best shown in FIGURES 2 and 3, a pair of powdered cream and sugar containers 21 are mounted on the door 11 on either side of the funnel 18. These containers are preferably filled and sealed at the factory and are adapted to be disposed of when empty, being formed of a molded plastic material. The containers are provided with grooves 22 in their side walls 23. Spaced apart studs 24, fixed to the door 11, are positioned so that they fit in the grooves 22 and support the containers (see FIGURE 2).

The lower wall portions of each of the containers 21 converge slightly as is shown in FIGURES 1 and 2, terminating in a downwardly extending mouth or outlet 25. Each mouth 25 is adapted to fit in an opening formed by the upwardly extending walls 26 of a dispensing valve housing 27, shown in section in FIGURE 4. Each housing 27 is a generally box-like structure of rectangular cross-section and is adapted to receive a slidably mounted, similarly shaped valve member 28. The housing 27 is preferably formed of two identically shaped side-by-side portions fastened together by pins 27a. The portions may be separated upon removal of the pins to facilitate the cleaning of the valve units.

A pair of springs 29 and 30 fit within each housing and normally urge the valve to the position shown in FIGURE 4. The valve is provided with a rectangular valve chamber 31 which is normally in alignment with the mouth 25 of its food powder container. In this position, stationary rectangular member 32 closes the bottom of the chamber allowing it to be filled, by gravity from its associated container 21.

Each valve 28 is operated by means of a lever arm 33, which is pivotally mounted on a pin 34, fixed to the door 11 by means of a bracket 35. The arms 33 extend downwardly into the recess 13 and are provided, at their lower extremity, with handles 36. The arms are dimpled slightly as shown at 37 at their point of contact with the end wall of the valve 28.

It will be apparent from the foregoing description that food powder will flow by gravity into the chamber 31, whenever the valve is in the position shown in FIGURE 4. When the handle 36 is pushed inwardly, compressing the springs 29 and 30, the valve walls 31a move off the stationary member 32 and the food powder will fall freely through opening 38 in the valve body.

In order to guide the powders into the awaiting cup C, a hopper 40 is mounted below the outlet opening of each valve 28 (see FIGURES 2 and 3). The hoppers have downwardly converging side walls and each hopper is provided with an opening 41 which is spaced directly over the cup support in position to discharge powder into a cup of hot beverage. The hoppers may best be visualized as forming wedged shaped polyhedrons. For reasons which will be described presently, the openings 41 are canted slightly towards the front of the vending machine cabinet as may be clearly seen in FIGURE 3.

In order to prevent the vapors arising from a cup C supported on the cup support 14 from contaminating the powdered cream and sugar, I provide fan 43, mounted towards the rear of the cabient 10 in the upper portion thereof. The fan 43 draws air through an opening in the bottom of the cabinet.

Operation of the fan causes an air flow down through the funnel 18 and each of the hoppers 40 to atmosphere. This flow of air sweeps the surface of the cup C and prevents the steamy vapors from entering the cabinet as well as the hoppers 40.

The openings 41 are preferably also shielded by a baffle 44 shown in FIGURES 1 and 4a. Baffle 44 shown in FIGURES 1 and 4 is connected by side walls 45 to the rear wall 15 of the recess 13. The baffle directs the flow of air downwardly across the top of the cup C.

In the preferred embodiment of the invention, the funnel 18 is mounted on a plate 46 which interconnects the hoppers 40 (see FIGURE 2). Plate 46 is removably mounted on the door by means of laterally extending ledges 47 which fit in grooves 48 in the side walls 45 (see FIGURE 2).

The dispensing valve bodies 27 are mounted on the door by means of downwardly opening grooves 49 which fit over and ride on the upper edges of the baffle plate 44. With this arrangement, the dispenser and hopper parts may be easily removed for cleaning and replacement, when desired.

From the foregoing description it will be evident that the present invention provides an extremely efficient means of preventing contamination of the food powders by the water vapor in a hot beverage vending machine. Among the chief features which contribute to this end are the novel hopper structure in combination with the baffle and the exhaust fan, the parts being so constructed and arranged as to prevent flow of air into the dispensing parts thereby avoiding contamination of the vending machine equipment with particles of food.

I claim:

1. In apparatus for preparing a hot beverage, wherein said apparatus is provided with a beverage discharge spout for filling a cup with the hot beverage, the combination comprising: a housing for said apparatus, said housing being provided with a front panel; an outwardly opening recess in said panel, said recess having a floor adapted to support the cup; a funnel within the housing, said funnel having a mouth beneath said beverage discharge spout and a delivery tube extending downwardly into the recess to deliver the hot beverage into the cup; a powdered food container mounted on each side of said funnel, each of said containers having a downwardly directed discharge opening; a metering valve for each of said food containers, each of said valves having an inlet opening aligned with the discharge opening together with actuating mechanism operable to dispense a metered quantity of food powder through said outlet opening; a hopper underneath each of said valve outlet openings, said hoppers and said funnel being formed as a unit, means for mounting said unit on said front panel including laterally extending grooves and cooperating laterally extending portions adapted to slidably fit within said grooves, a discharge opening from each of said hoppers, said openings being positioned to discharge powder into the cup, said openings being further positioned to face towards the front of said cabinet; a fan within said housing for creating a flow of air downwardly through said hoppers and across the face of the cup to atmosphere; and a baffle plate extending downwardly into said recess in front of said hopper openings, to further divert the flow of air over the surface of the cup.

2. Apparatus according to claim 1 which further includes means removably mounting said valve means on said front panel.

3. In apparatus for preparing a hot beverage, wherein said apparatus is provided with a beverage discharge spout for filling a cup with the hot beverage, the combination comprising:

a housing for said apparatus, a front panel hinged to said housing;

an outwardly opening recess in said panel, said recess having side and rear wall portions, and a floor for supporting a cup;

a funnel mounted over said recess, said funnel having a mouth beneath said beverage discharge spout and a delivery tube extending downwardly into the recess to deliver hot beverage into a cup positioned on said floor;

a powdered food container on each side of said funnel, mounting posts on said front panel and grooves in said containers cooperating with said posts for removably mounting the containers on the front panel;

a metering valve for each of said food containers, each of said valves having an inlet opening shaped to embrace the discharge opening of one of said food containers, said valves further having an outlet opening and actuation mechanism operable to dispense a metered quantity of food powder upon actuation thereof;

a hopper underneath each of said valve outlet openings;

a mounting plate associated wtih said hoppers and said funnel;

grooves in the side walls of said recess, said plate being shaped to fit in said grooves for support of said funnel and said hoppers;

a baffle plate associated with said front panel, extending downwardly into said recess in front of said hopper openings, said baffle plate having an upwardly extending ridge; and downwardly extending grooves on each of said valves, said grooves being mountable on said ridge for securing the valves to said baffle plate.

References Cited

UNITED STATES PATENTS 2,796,893   1/1957   Tamm _____ 141—100
3,045,870   7/1962   Danziger et al. __ 222—129.3 X

FOREIGN PATENTS 630,873   11/1961   Canada.

LAVERNE D. GEIGER, *Primary Examiner.*

EDWARD J. EARLS, *Assistant Examiner.*

U.S. Cl. X.R.

141—100, 369; 222—129.3; 312—329